Feb. 16, 1965   J. SHIFFMAN   3,169,306
DEVICE FOR APPLYING AND REMOVING WATCH CRYSTALS
Filed Jan. 14, 1963
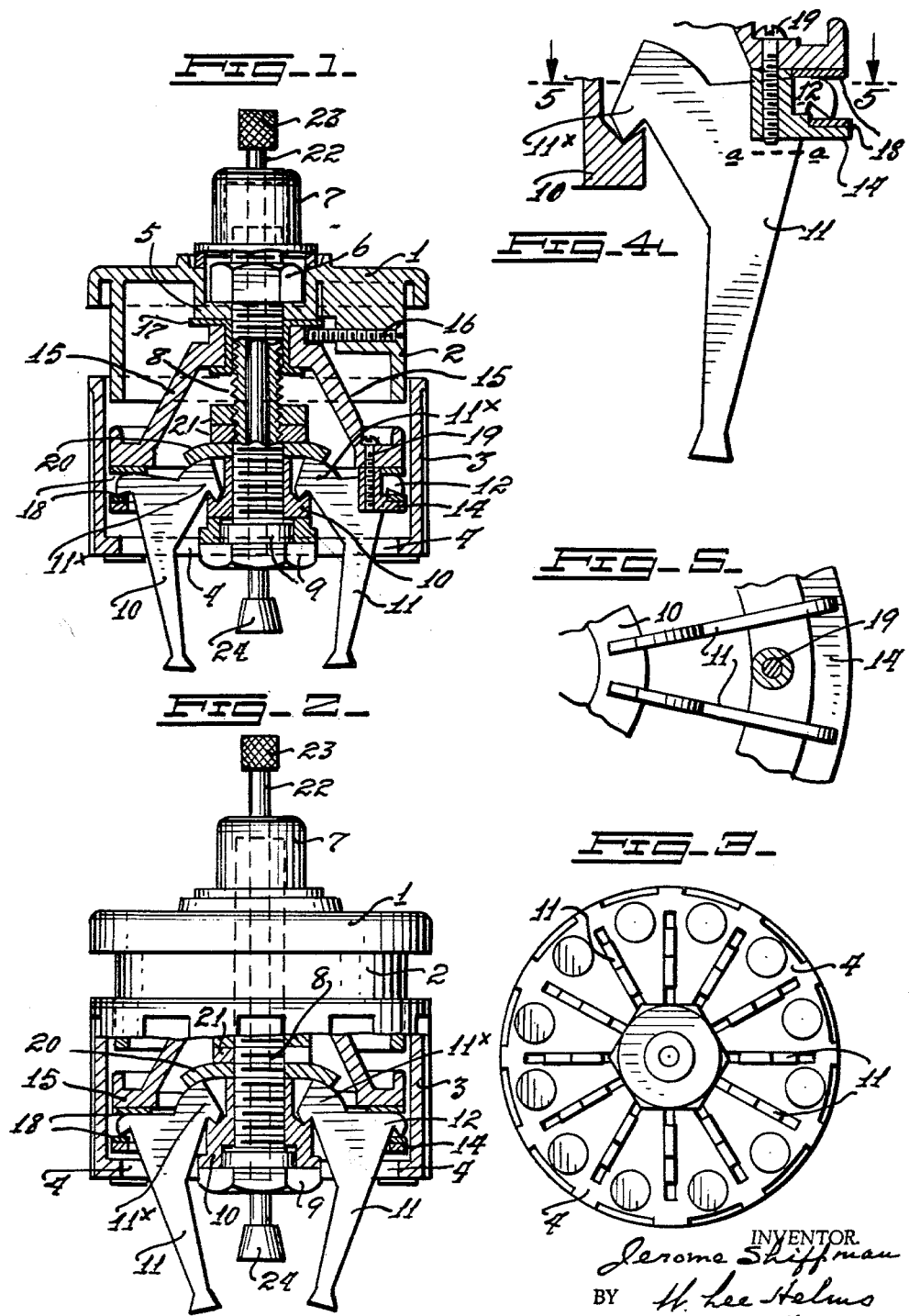
INVENTOR.
Jerome Shiffman
BY H. Lee Helms
attorney.

United States Patent Office 3,169,306
Patented Feb. 16, 1965

3,169,306
DEVICE FOR APPLYING AND REMOVING WATCH CRYSTALS
Jerome Shiffman, New York, N.Y., assignor to Standard Unbreakable Watch Crystals, Inc., Bronx, N.Y., a corporation of New York
Filed Jan. 14, 1963, Ser. No. 251,087
2 Claims. (Cl. 29—210)

The present invention relates to tools for removing and fitting watch crystals, and particularly crystals of the so-called unbreakable type which are composed of hard plastic material. The invention has particular references to a device which will engage a watch crystal while it is in place in the watch rim and remove it therefrom. The device is also adapted to hold a crystal in a manner to enable it to be refitted in place in the watch rim or to be used to fit a new crystal in place in the watch.

It is an object of the invention to provide a device of this character which is free from a spring or springs; which can be readily manipulated; which will accurately and firmly engage and hold a crystal, and which will be of strong and durable construction.

In the accompanying drawings:

FIG. 1 is a vertical sectional view through an embodiment of the invention.

FIG. 2 is a view similar to FIG. 1, showing that the upper and operating cup-like member of the casing has been rotated to move the gripping flanges inwardly.

FIG. 3 is a bottom plan view of the lower wall of the lower cup member.

FIG. 4 is a detail vertical fragmentary view of the immediate contacting members for the fingers, with one finger shown in position.

FIG. 5 is a horizontal section on the line 5—5, FIG. 4.

Referring to the drawings, the casing is composed of two sections or halves, the upper section being of cup-shaped formation and includes a top wall 1 and a skirt 2. The skirt 2 is for hand engagement for rotation.

The lower section 3 of the casing also is of cup-shape and it includes a bottom wall 4. Both the upper and lower cup-shaped parts of the casing may be, like other parts of the device, composed of plastic material if desired, or they may be made of metal. The lower casing section 3 is of such internal diameter that the skirt 3a of the upper cup 1 fits within it so that the upper section 2 may be rotated and moved axially within the lower cup in telescopic fashion.

Centrally provided in the upper wall of the upper casing section 2 is a boss 5 providing a recess or well which accommodates a hexagonal or other formed nut 6 and the well may be of complementary shape to the exterior of the nut. The nut 6 is confined in the recess or well by means of a cap 7 secured to the top wall of the upper casing member over the well. This arrangement is such that by rotation of the upper casing member, the nut 6 will be threadably moved up or down on a threaded tubular stem 8 on which it is mounted and which extends centrally and axially through the casing and through the recess or well at boss 5.

The said threaded stem 8 receives at one end, at the lower end of the tool, a hexagonal or off-round nut 9, tightly fitted within a suitable aperture in the bottom wall 4 of the lower casing member, thereby maintaining the threaded shaft against rotation with respect to said lower casing member.

Mounted on the threaded stem 8 adjacent to the head end of the same, is a sleeve 10, provided with an annular groove, FIGS. 1 and 2, the wall of the groove receiving and engaging the inner hook end $11^x$ of each of a plurality of watch-crystal engaging fingers 11. Each finger 11 is in the form of a flat metal plate having a widened head at its upper end and terminating in a slightly flared lower extremity. At its upper end, each finger is formed with an outer hooked nose portion 12 so shaped as to engage with the wall of a ring 14.

Ring 14 is provided with a receiving slot extending from its inner margin, for each finger 11, the length of the slot being indicated in FIG. 4 by the dotted line a—a. Ring 14 is secured to a frusto-conical follower 15 which has an axial aperture through which stem 8 passes. This follower is secured to the upper rotary casing member 2, as by suitable screws, one of which is indicated at 16, FIG. 1. Each of the screws enters a channelway in frusto-conical follower 15, and in the drawings this channelway is constituted, at its top, by a metallic washer flange 17. By the use of the word "secured" is meant that rotation of the upper casing member 1 on threaded stem 8 will cause up and down movements of the frusto-conical without requiring rotation of the latter.

Under and above the hook nose 12 of each gripping finger may be positioned wear rings 18 when the frusto-conical member 15 and the ring 14 are made of plastic. The ring 14 is secured to the frusto-conical member 15 in any suitable manner as by a plurality of screws, one of which is shown at 19, FIG. 1 and FIG. 4.

It will be seen that by the described construction, rotation of the upper casing member 1 on stem 8 by means of the threaded engagement of said member, conical follower 15 will move the fingers inwardly or outwardly in accordance with the direction of said rotation, and that the hooked inner end of each figure will rock in the groove of sleeve 10 and under a confining dished plate 20, the latter being held in position on the stem by nuts 21.

In the embodiment illustrated, the tubular stem has passed through a rod 22, the rod being provided with a finger piece at 23. At its lower end the rod is provided with a pressure head 24 for engaging a watch crystal when the watch is held with its face upwardly on a suitable stand.

It will be understood that various modifications may be made in the form and arrangement of the elements illustrated in the drawings without departing from the spirit of the invention.

Having described my invention, what I claim and desire to secure by Letters Patent is as follows:

1. A device for applying and removing watch crystals with respect to watches, comprising a pair of cup-like casing members in telescopic relation, one being an upper cup member, and the second being a lower cup member having a base wall, a threaded shaft extending through an axial opening in the upper cup and fixedly held by the lower cup base wall, the upper cup member being threaded on said shaft, an annularly channeled member carried by said shaft above the base wall of the lower cup, said base wall being formed with a plurality of radial passages, a plurality of gripping fingers movable in said passages, each finger having two oppositely directed nose portions, one of said nose portions being received in the channel of said annularly channeled member and adapted for rocking motion therein, and means surrounding said shaft and carried by the upper cup member and engaging the outermost of said nose projections of the gripping fingers, said last named means being adapted to rock the fingers in accordance with the rotation of said upper cup member.

2. A device for applying and removing watch crystals with respect to watches, constructed in accordance with claim 1, in which the means adapted to rock the fingers in accordance with rotation of said upper cup member consists of a ring-like member slotted to receive an area of each finger inwardly of an outermost one of its oppositely directed nose portions, said ring-like member engaging an under surface of said nose, and a frusto-conical member carrying said ring-like member, said frusto-conical member surrounding the threaded shaft and carried by the said upper cup member and engaging the upper surface of said outwardly directed nose.

References Cited in the file of this patent
UNITED STATES PATENTS

| | | |
|---|---|---|
| 3,052,906 | Shiffman | Sept. 11, 1962 |
| 3,068,558 | Shiffman | Dec. 18, 1962 |